Dec. 11, 1945.   F. S. WHEELER   2,390,819
ELECTRICAL CIRCUIT PROTECTIVE DEVICE
Filed Dec. 26, 1942   3 Sheets-Sheet 1

WITNESSES:
Edward Michaels
G. S. Parker

INVENTOR
Floyd S. Wheeler.
BY
Ralph H. Swingle
ATTORNEY

Patented Dec. 11, 1945

2,390,819

UNITED STATES PATENT OFFICE 2,390,819

ELECTRICAL CIRCUIT PROTECTIVE DEVICE

Floyd S. Wheeler, Arlington, Va., assignor to Westinghouse Electric Corporation, East Pittsburgh, Pa., a corporation of Pennsylvania Application December 26, 1942, Serial No. 470,195

13 Claims. (Cl. 200—88)

The invention relates to electrical circuit protective devices or circuit interrupters for automatically effecting interruption of the circuit in response to predetermined abnormal conditions in the circuit.

An object of the invention is the provision of an improved circuit protective device or circuit interrupter of simple and economical construction adapted to satisfactorily meet various requirements in the protection of electrical circuits.

Another object of the invention is the provision of improved circuit controlling apparatus adapted to automatically cause interruption of the circuit after a predetermined time delay in response to a continued abnormal condition in the circuit and also operable instantaneously to cause interruption of the circuit upon the occurrence of an overload current above a predetermined magnitude in the circuit.

Another object of the invention is the provision of a circuit breaker with an improved tripping means for tripping the breaker after a time delay in response to a continued overload and for tripping the breaker instantaneously upon the occurrence of a heavy overload or short circuit condition.

Another object of the invention is the provision of an improved circuit controlling device comprising an electromagnet having a single movable armature which is magnetically actuated in one direction after a time delay in response to a continued abnormal circuit condition to effect a circuit controlling operation and which is instantaneously actuated in the opposite direction upon the occurrence of a heavy overload or short circuit condition to effect a circuit controlling operation.

In accordance with the invention, an electromagnet structure is provided having a movable armature and two parallel magnetic circuits having poles on opposite sides of the armature for moving the armature in opposite directions. One of the poles is closer to the armature than the other and a part of magnetic circuit through this pole is arranged to become saturated at normal rated current or some relatively low value of overload current. The armature is attracted by the closer pole and a time delay device is provided which normally restrains the armature from moving to the closer pole. Upon the occurrence of a continued overload or other abnormal condition, the time delay device after a time delay releases the armature thereby allowing it to move to attracted position against the closer pole. Upon the occurrence of a heavy overload or short-circuit condition, the armature is instantaneously attracted to the more remote pole due to the large increase in flux. Movement of the armature in either direction operates a pair of contacts to electrically trip a circuit breaker, or directly mechanically trips a circuit breaker mechanism. The time delay device in accordance with one embodiment is a current responsive bimetal latch which provides inverse time delay. A modification of the invention utilizes a conventional time delay structure such as an oil sucker pot in place of the bimetal latch. Another modification utilizes an undervoltage device for restraining the armature to provide undervoltage protection.

The novel features that are considered characteristic of the invention are set forth in the appended claims. The invention itself, both as to structure and mode of operation, together with additional objects and advantages thereof, will be best understood from the following detailed description of several embodiments thereof when read in conjunction with the accompanying drawings in which:

Figure 1:
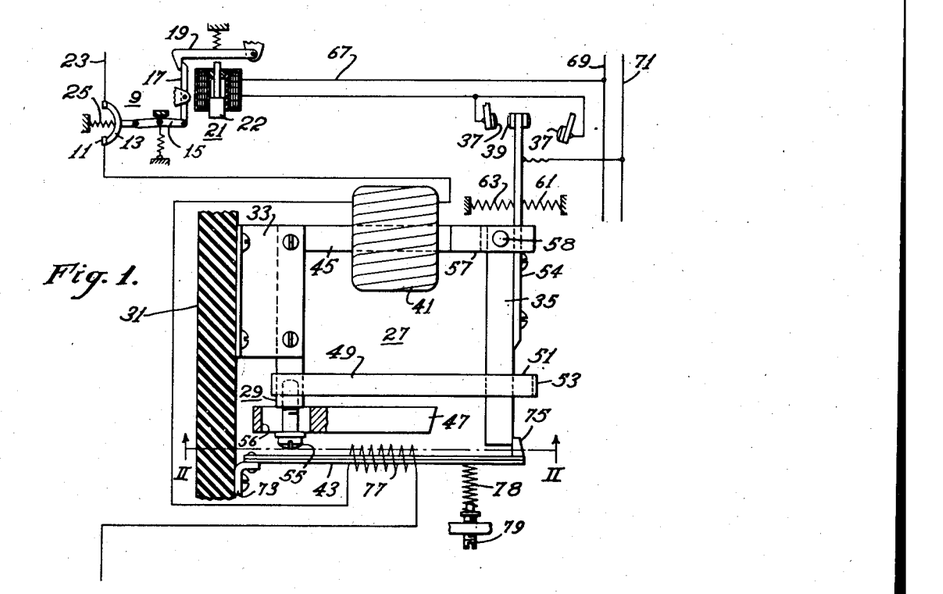
Figure 1 is a somewhat schematic view of circuit controlling apparatus embodying the invention.
Figure 2:
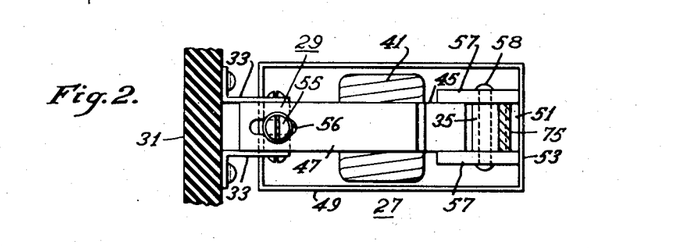
Fig. 2 is a sectional view taken substantially on the line II—II of Fig. 1.

Referring to Fig. 1 of the drawings, the reference numeral 9 designates a circuit breaker which may be of any conventional construction either of the air break, oil break or gas blast type. The circuit is schematically shown as comprising stationary and movable contacts 11 and 13 and a trip-free operating mechanism consisting of an operating toggle 15, and a linkage 17 supporting the outer end of the toggle and normally held in operative thrust transmitting position by latching means 19 which is adapted to be released to trip the breaker by means of a trip solenoid 21 that has a movable core 22 which is moved upwardly to release the latch 19 upon energization of the winding of the solenoid 21. The circuit breaker is connected in and controls a main circuit represented by the single line 23 which may be a motor circuit or other power circuit. Although shown as a single pole breaker, it will be understood that the breaker may be of the conventional multi-pole type in which the contacts of all poles are simultaneously operated by a single operating mechanism such as that schematically shown. The circuit breaker is adapted to be closed by any suitable closing means (not shown) which moves the toggle to the extended overset position shown. Tripping operation of the breaker is effected upon energization of the tripping solenoid 21 which releases the latch 19 which permits the toggle and linkage to collapse and the breaker to be opened by its opening spring means shown schematically at 25. The linkage 17 automatically resets in engagement with the latch 19 immediately following tripping of the breaker.

In order to provide satisfactory protection to electric motor equipment or other apparatus and conductors of the circuit, it is desirable to provide for automatically tripping the circuit breaker after a time delay in response to continued overload current conditions and also instantaneously upon the occurrence of a heavy overload or short-circuit condition. In accordance with the embodiment of the invention shown in Fig. 1, this protection is provided by an overload responsive device 27 in the form of a relay for controlling operation of the circuit breaker tripping means 21.

The protective relay 27 comprises a magnetizable structure indicated generally at 29 supported on an insulating base 31 by brackets 33, a cooperating movable armature 35 for controlling relay contacts 37—39, an energizing conductor means or winding 41 for energizing the magnetizable structure and armature, and a time delay device consisting of a current responsive bimetal element 43.

The magnetizable core structure 29 is made up of an L-shaped member 45 and an adjustable bar 47 both of magnetic material which provide a main magnetic circuit completed by the armature 35. In parallel with the bar 47 is a looped shaped shunting member 49 of magnetic material secured at its inner end to L-shaped member 45 adjacent the bar 47. The member 49 is of smaller cross-section than the magnetic members 45 and 47 and encircles the core 45 and armature 35, leaving a relatively small air gap as shown at 51 between the armature and the outer end 53 of the loop. The bar 47 is adjustably secured to the inner end of the L-shaped member 45 by means of a screw 55 which passes through an elongated slot 56 in the bar 47 and threads into the end of the L-shaped member 45. The bar is adjustable to change the length of the air gap between the outer end of the bar 47 and the free end of the armature 35 to thereby select the magnitude of overload current above which the armature will be instantaneously attracted to the bar 47 to actuate the relay. This air gap is considerably longer than the air gap 51. The winding 41 is connected in series in the main circuit 23 so that the magnetic structure will be energized in a predetermined response to the current of the circuit.

The armature 35 has an arm 54 secured thereto, and the armature is pivotally mounted on the core member 45 by a pivot pin 58 supported in side plates 57 of magnetic material secured on opposite sides of the core member 45 adjacent the outer end thereof. A pair of springs shown schematically at 61 and 63 serve to bias the armature to its normal intermediate position as shown in Fig. 1.

The relay contact 39 is mounted on the extending end of the arm 54 and is disposed between the cooperating stationary contacts 37. Contacts 37 and 39 are connected in series in an energizing circuit 67 for the circuit breaker trip coil 21, energy being supplied to the circuit 67 from an auxiliary source of electrical energy represented by the supply lines 69—71. Movement of the armature in either direction closes the contacts 37—39 thereby completing the energizing circuit 67 to effect operation of the circuit breaker tripping solenoid 21.

The current responsive bimetal element 43 comprises a strip of bimetallic material fixedly mounted at its inner end on a bracket 73 secured to the base 31. The outer end of the bimetal element carries a latch 75 which normally is adapted to engage the outer side of the free end of the armature 35 to restrain the armature from being moved to attracted position against the outer end 53 of the magnetic shunting loop 49. This end 53 forming one of the two poles of the magnetic structure, the other pole being the outer end of the bar 47.

The bimetal element 43 is adapted to be heated in response to the current of the main circuit 23 as by a heating conductor or heater 77 which may be connected in series in the circuit 23 as shown in Fig. 1. The construction of the bimetal element and its heater is such that a continuous flow of normal rated current in the circuit 23 does not produce substantially any deflection or warping of the bimetal element 43. However, heating of the bimetal element in response to continued overload currents is sufficient to produce deflection thereof, and when the bimetal element becomes heated a predetermined amount by overload current, it deflects or warps downwardly away from the magnetic structure, causing the latch 75 to disengage the armature 35, thereby permitting the armature 35 to be moved to attracted position against the end or pole 53 of the shunting loop 49. This movement of the armature effects closing of the relay contacts 37—39, thereby effecting energization of the circuit breaker tripping solenoid 21 and tripping of the circuit breaker 9. Due to the time required to heat the bimetal element a sufficient amount to produce deflection thereof, the bimetal element introduces a time delay in the operation of the relay in response to overload currents up to a predetermined magnitude. The time delay varies inversely as the magnitude of the overload current.

An adjusting means comprising a spring 78 and an adjusting screw 79 is provided for adjusting the minimum overload trip current necessary to produce deflection of the bimetal element 43.

The magnetic structure provides two magnetic circuits in parallel through the armature 35, the main magnetic circuit extends through the L-shaped core member and bar 47 and the auxiliary magnetic circuit extends through the core member 45 and shunting loop 49, both circuits being completed through the armature 35. The outer end of the bar 47 forms one pole of the magnet structure, and the outer end 53 of the shunting loop 49 forms the other pole of the magnet structure which is on the opposite side of the armature 35.

The magnetic shunting loop 49 is designed to saturate at approximately full rated load current of the main circuit 23, and the design of the magnetic structure is such that at all operating loads the armature 35 will be attracted rather strongly towards the pole 53 of the magnetic shunting loop because of the relatively small air gap 51 as compared to the larger air gap between the armature and the bar 47. On heavy overloads above a predetermined magnitude, for example, above eight to ten times normal rated current of the circuit, and on short circuits, a strong magnetic field will be built up in the main magnetic circuit through the bar 47, and consequently the armature 35 will be instantly moved to attracted position against the pole of the bar 47, thereby effecting closing of the relay contacts 37 and 39 to energize the circuit breaker tripping solenoid 21. As previously explained, the bar 47 is adjustable to adjust the instantaneous operating point of the relay.

The operation of the apparatus is briefly as follows. Upon the occurrence of the continued overload below the aforementioned predetermined magnitude, the bimetal element 43 becomes heated thereby, and, when heated a predetermined amount, warps downwardly releasing the armature 35, whereupon the armature moves in a counterclockwise direction about its pivot 58 to its attracted position against the pole 53 of the magnetic shunting loop 49. This movement of the armature closes the relay contacts 37 and 39 to complete the energizing circuit for the circuit breaker tripping solenoid 21, thereby causing the circuit breaker to be tripped to open circuit position interrupting the main electrical circuit 23. Upon interruption of the main electrical circuit, the relay becomes deenergized and the armature 35 immediately returns to its normal intermediate position as shown in Fig. 1, the bimetal element 43 cools and returns the latch 75 into latching engagement with the armature 35. The circuit breaker mechanism linkage 17 immediately resets following a tripping operation and consequently the circuit breaker may be reclosed as soon as the relay has returned to its normal position as shown in Fig. 1.

Upon the occurrence of an overload above the predetermined magnitude, or upon the occurrence of a short circuit, a strong magnetic field builds up in the main magnetic circuit including the bar 47, and the armature 35 is consequently immediately moved in a clockwise direction to attracted position against the pole of the bar 47. This movement of the armature closes the relay contacts 37 and 39 to thereby complete the energizing circuit of the circuit breaker tripping solenoid 21 to effect tripping of the circuit breaker. In this case the circuit breaker is tripped instantaneously without any time delay, thereby protecting the main electrical circuit or the motor from damage by heavy overloads or short circuits. As soon as the circuit is thus interrupted, the circuit breaker mechanism resets and the relay returns to its normal position.

Figure 3:
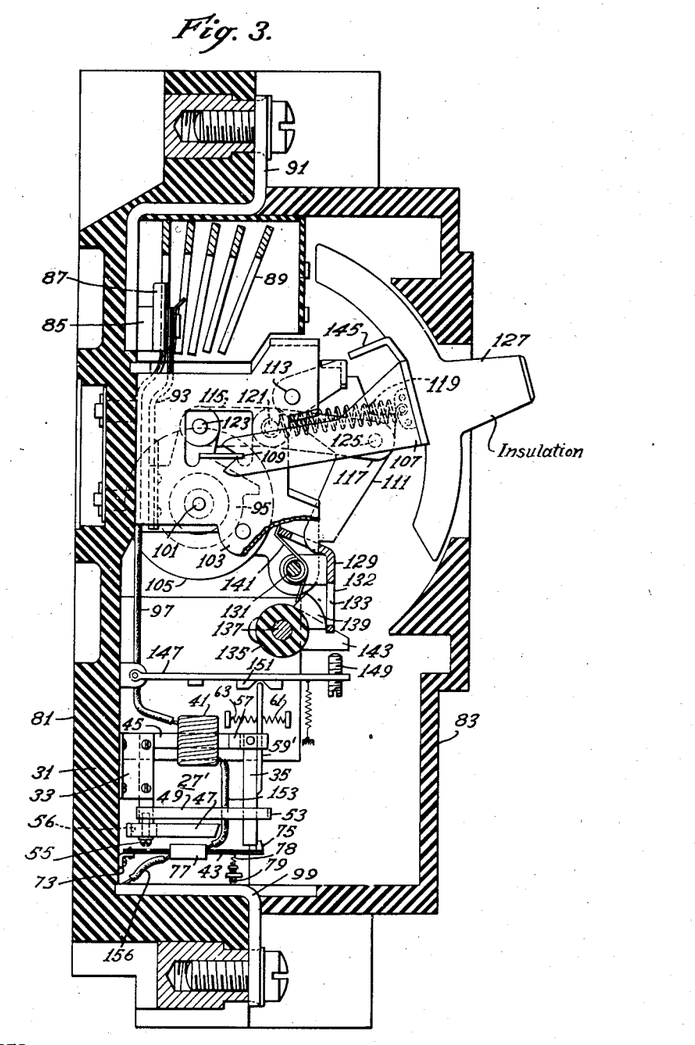
Fig. 3 is a sectional view of a circuit breaker embodying a modification of the invention wherein the electromagnetic device is arranged to directly mechanically trip the breaker mechanism.

A modification of the invention is shown in Fig. 3 of the drawings. In accordance with this modification the overload responsive device is in the form of a trip device for mechanically tripping the circuit breaker mechanism in response to overload conditions. The main circuit breaker structure, except for the trip device, is generally similar to the main circuit breaker structure shown in Figs. 2 and 3 of Patent No. 2,162,577, issued to H. S. Gano June 13, 1939, and assigned to the assignee of the present invention. The circuit breaker in this instance is a three-pole circuit breaker which is mounted in an insulating casing comprising a base 81 of molded insulating material and a removable cover 83 also of molded insulating material. Each pole of the circuit breaker includes a stationary contact 85, cooperating movable contact 87 and an arc extinguisher 89. The stationary contact is mounted on the inner end of a terminal strip 91 and the movable contact 87 is carried by the free end of a spring steel contact arm 93 secured to a rotatably mounted switch member 95. The movable contact is electrically connected by a flexible shunt conductor 97 to one of the overload responsive tripping means, the other terminal of which is electrically connected to a terminal conducting strip 99.

The three movable switch members are mechanically connected for simultaneous movement together by means of a pivot shaft 101, the center section of which is supported by side walls of a U-shaped main frame 103. Switch members 95 of the outer poles (not shown) are secured to the outer sections of the pivot shaft but insulated therefrom and from each other by insulating connecting hubs 105. The outer ends of the sectional pivot shaft are supported in brackets (not shown) mounted adjacent the sides of the base 81.

A single operating mechanism is provided for simultaneously actuating the contact means of all three poles of the breaker to open and to closed circuit position. The operating mechanism is mounted on the main frame 103 and comprises a U-shaped operating member 107, the legs of which are pivoted on the sides of the main frame by pivots 109, a releasable carrier lever 111 pivoted on the main frame by a pivot shaft 113, a pair of toggle links 115 and 117, and a pair of overcenter springs 119 (only one being shown). The toggle links 115 and 117 are connected together by a knee pivot pin 121 and the inner link is connected by the pivot pin 123 to the center pole switch member 95. The other toggle link 117 is pivotally connected at its outer end by a pivot 125 to the releasable carrier lever 111. The overcenter springs have their outer ends connected to the bight portion of the U-shaped operating member 107 and their inner ends connected to the knee pivot pin 121. The operating member 107 has a handle 127 of insulating material secured to the outer end thereof, and a knob portion of the handle extends through an elongated slot provided therefor in the cover 83. The carrier lever 111 is always biased in a counterclockwise direction (as viewed in Fig. 3) about its pivot 113 by a component of the force of the overcenter springs. The lower end of this lever is adapted to be normally engaged and restrained by a main latch 129 to hold the carrier lever in normal operative position shown in Fig. 3. In this normal position the lever provides a fixed pivot for the outer end of the operating toggle so that the breaker contacts can be manually operated to open and closed position by the operating handle. When the breaker is in closed position the carrier lever is held latched and acts through the operating toggle to hold the contacts locked in closed position until the carrier is released by the latch or until the contacts are manually operated to open position.

When the carrier lever 111 is released by the latch 129, the circuit breaker is automatically actuated to open position by the springs 119 irrespective of the position of the handle 127, that is, even if the handle is held in closed position.

Thus the circuit breaker mechanism is trip-free of the handle 127. The circuit breaker contacts are adapted to be manually operated to open position by movement of the handle 127 downwardly to its "off" position. This movement of the handle moves the line of action of the overcenter springs below the pivot 125, whereupon the springs operate the toggle to collapsed position, thereby causing actuation of the contacts to open position with a snap action. To manually close the circuit breaker, the operating handle is moved upwardly to the "on" position as shown in Fig. 3. This closing movement of the handle moves the line of action of the springs 119 above the pivot 125, thereby causing the toggle to be actuated by the springs to the extended overset position shown effecting closing of the contacts with a snap action. The latch 129 is pivotally mounted on a pivot pin 131 supported by the side walls of the frame 103, the latch being provided with spaced legs which pivotally engage the pivot pin 131.

An upper angular extension of the latch 129 is provided with a rectangular aperture or slot. The outer end edge of this slot forms a latch surface which engages and restrains the carrier lever 111. The opposite end edge of the slot is adapted to be engaged by the free end of the carrier lever 111 to reset the latch 129 to latching position when the carrier lever 111 is manually reset to its latched position after a tripping operation of the lever. The latch 129 is also provided with downwardly extending portion 132 having a rectangular aperture or slot 133 therein. A trip bar 135 of insulating material extends transversely across the three poles of the breaker and is mounted for rotation about its longitudinal axis by shaft 137 embedded in and extending through the trip bar. The projecting ends of the shaft 137 are supported in brackets (not shown) secured to the breaker base on the opposite sides thereof. An arcuate metal latch piece 139 is embedded in the bar adjacent the center thereof in alignment with the rectangular slot 133. In the latching position of the parts the carrier lever 111 is latched by the main latch 129 and this main latch is in turn held in latching position by the latch piece 139, the lower end of the extension 131 bearing against the arcuate edge of the latch piece 139. A spring 141 coiled about the pivot pin 131 biases the main latch 129 in unlatching direction and biases the trip bar to latching position. A plurality of spaced projections 143 are formed on the trip bar, one for each of the three poles of the breaker.

The trip bar is adapted to be partially rotated in a counterclockwise direction to trip the circuit breaker in response to predetermined overload conditions in the circuit of any pole of the breaker. When the trip bar is thus rotated to tripping position the latch piece 139 moves from under the lower end of the main latch extension 132 thereby permitting the main latch 129 to release the carrier lever 111. When the carrier lever is thus released, the contacts of the breaker are no longer held in closed position, and consequently the overcenter springs 119 quickly actuate the three movable contacts to open position. The carrier lever 111 is rotated by the springs in a counterclockwise direction about its pivot 113 and during this movement the pivot pin 125 is shifted above the line of action of the springs 119, whereupon the toggle collapses and the handle is moved to an intermediate indicating position. The carrier lever 111 must be reset to latched position before the breaker can be closed again, and for this purpose the operating member 107 has a resetting projection 145, which engages and moves the carrier lever 111 back to its latching position when the operating handle 127 is moved downwardly slightly beyond the "off" position to reset the mechanism. During the resetting movement the free end of the carrier lever moves into the aperture of the upper inclined projection of the main latch 129 and restores the main latch to latching position, whereupon the spring 141 returns the trip bar to its latching position as shown. The main circuit breaker structure as thus far described in detail is substantially similar to the main circuit breaker structure disclosed in Figs. 2 and 3 of the aforementioned Patent No. 2,162,577.

Each pole of the breaker is provided with a pivoted trip arm 147 pivoted at its inner end on the base 81. The outer end of each trip arm 147 is disposed adjacent a corresponding one of the trip bar projections 143, and this outer end of the trip arm carries a screw 149 for engaging the projection 143 to actuate the trip bar to tripping position upon upward movement of the trip arm 147. Each pole of the circuit breaker is provided with an overload current responsive trip device 27' which is of substantially the same construction as the device 27 of the original embodiment, except that the arm to which the armature is secured in this modification is adapted to mechanically actuate the trip bar of the circuit breaker upon operation thereof instead of operating relay contacts. Since the structure of the overload responsive device 27' is essentially the same as that of the device 27 of the original embodiment with the exception noted above, the same reference characters have been used to designate the corresponding parts, all of which function in the same manner as described in the original embodiment in the operation of the device. The upper end of the armature arm 59' cooperates with a cam 151 on the corresponding trip arm 147, the cam being provided with inclined portions so that movement of the armature 35 in either direction will produce upward movement of the trip arm 147 to actuate the trip bar 135 to tripping position, releasing the circuit breaker mechanism. The flexible shunt conductor 97 of the circuit breaker pole is connected to one end of the magnet winding 41, the other end of the winding being connected by a conductor 153 to the heater 77. The heater is, in turn, connected by a conductor 156 to the lower terminal strip 99 of the breaker. The winding 41 and the heater 77 are thus connected in series with the contacts of the breaker so as to be energized in response to the current of the circuit of the corresponding pole.

As in the case of the original embodiment, the armature 35 is attracted strongly to the pole at the outer end of the magnetic shunting loop 49 during normal current conditions and also on overload currents up to the predetermined magnitude which may be eight to ten times the normal rated current of the circuit breaker. Movement of the armature to this pole is normally prevented, however, by the bimetal element 43. Upon the occurrence of a continued overload in the circuit of any pole of the circuit breaker, the corresponding bimetal element 43 is heated by the overload current, and, when heated a predetermined amount, releases its armature 35, thereby permitting movement of the armature to attracted position against the pole at the outer end of the magnetic shunting loop 49. This movement of the armature acts through the cam 151 to move the corresponding trip arm 147 upwardly, thereby actuating the trip bar 135 to tripping position which causes automatic opening of the circuit breaker in the manner previously described. Following a tripping operation the trip device 27' resets to its normal position as shown, and the circuit breaker mechanism may be manually reset in the previously described manner.

Upon the occurrence of a heavy overload above the predetermined magnitude or a short-circuit in any pole of the circuit breaker, the armature 35 of the trip device of the corresponding pole is immediately moved to attracted position against the bar 47. This movement of the armature acts through the cam 151 to move the trip arm 147 upwardly, thereby effecting movement of the trip bar 135 to tripping position causing automatic opening of the circuit breaker. In this case tripping of the breaker is effected instantaneously without any time delay action.

Figure 4:
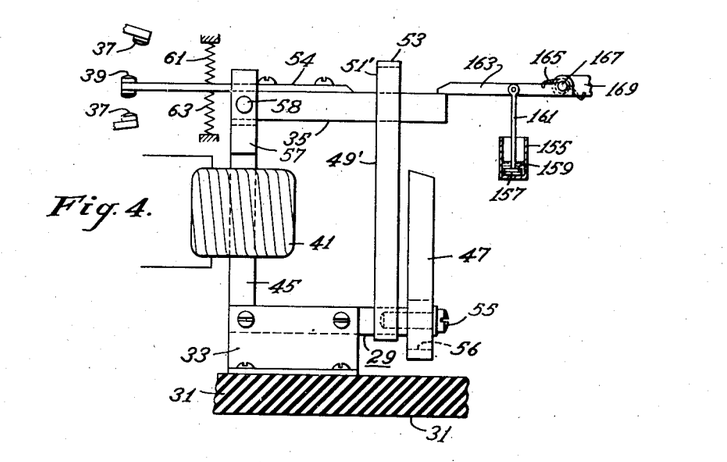
Fig. 4 is a partial view showing somewhat schematically another modification of the invention utilizing a mechanical time delay device which provides a time delay on overloads up to the instantaneous operating point.

Another modification of the invention is shown in Fig. 4. The overload responsive protective relay shown in Fig. 4 is of essentially the same construction as the relay shown in Fig. 1 and described in connection therewith except that the bimetal latch is omitted and a time delay device in the form of a liquid dashpot of the sucker type is substituted in place of the bimetal latch for normally restraining the armature 35 from being attracted to the magnetic shunting loop. Also in this modification the magnetic shunting loop is made slightly longer so as to provide a slightly greater air gap between the armature and the magnetic shunting loop, so that the armature will be attracted strongly to this loop only in response to overload currents and not in the case of normal rated current flow. The parts which are of identical construction to those of the relay shown in Fig. 1 have been indicated by the same reference characters in Fig. 4, and they function in substantially the same manner. As explained above, the magnetic shunting loop 49' is made of such length that the air gap 51' is slightly greater than the air gap 51 of the Fig. 1 embodiment, so that the armature 35 will only be attracted to this loop strongly enough to operate the relay in response to overload current and not in response to normal rated current. The time delay device in this embodiment of the invention comprises an oil pot 155 having a fixed suction element 157 secured to the bottom thereof. The suction element 157 cooperates with a movable suction element 159 which is connected by a rod 161 to a pivoted lever 163 which engages the outer side of the armature 35 adjacent the free end thereof. The lever 163 is biased to the restraining position shown by means of a spring 165, the lever being pivoted by a pivot 167 to a fixed frame 169. A body of oil or other viscous liquid is disposed in the pot 155 and the suction elements 157 and 159 have highly polished surfaces which are adapted to engage beneath the liquid in the pot 155. These suction surfaces adhere strongly to one another and provide a substantially fixed time delay prior to releasing the armature 35 in response to a continued overload up to the predetermined magnitude. The relay contacts 37 and 39 of this embodiment are adapted to control the tripping solenoid of a circuit breaker in the same manner as shown in Fig. 1.

The operation of the modification shown in Fig. 4 is briefly as follows. During the continuance of normal current conditions in the main circuit, the attractive force developed in the magnetic shunting loop 49' is insufficient to move the armature 35 to attracted position to the pole 53 against the force of the springs 63 and 165. However, upon the occurrence of a continued overload below the predetermined magnitude, for example, below eight to ten times the normal rated current of the circuit breaker in the circuit, sufficient magnetic flux is developed in the shunting loop 49' to actuate the armature 35 to attracted position against the pole 53. The time delay device 155—159, however, introduces a time delay to delay actuation of the armature for a predetermined time interval. If the overload condition should cease before the elapse of the time interval the armature will not be actuated. Actuation of the armature to attracted position against the pole 53 causes closing of the relay contacts 37—39 to effect a tripping operation of the main circuit breaker.

Upon the occurrence of an overload above the predetermined magnitude or a short-circuit, the energizing winding 41 will be energized sufficiently to build up a strong magnetic field in the main magnetic circuit 45—47 sufficient to instantaneously actuate the armature 35 to attracted position against the bar 47. This movement of the armature closes the relay contacts 37—39 to cause a tripping operation of the main circuit breaker.

Figure 5:
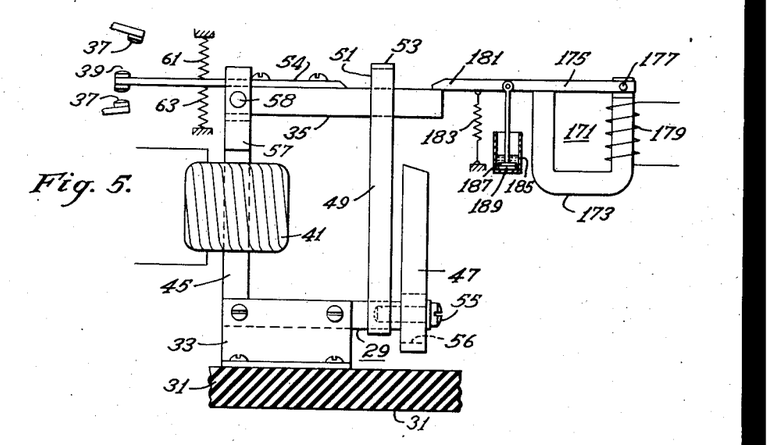
Fig. 5 is a partial view showing somewhat schematically another modification of the invention which provides undervoltage protection.

A further modification of the invention is illustrated in Fig. 5. In the modification of Fig. 5, the structure of the relay device is identical to that of the Fig. 1 embodiment except that in this modification an undervoltage responsive device indicated generally at 171 is substituted in place of the current responsive bimetal latch device utilized in the Fig. 1 embodiment. The parts of the relay which are identical to those of the Fig. 1 embodiment have been indicated by the same reference characters. The undervoltage device 171 comprises a stationary U-shaped magnet core 173, a cooperating pivoted armature 175 pivoted on the core 173 at 177, and an energizing winding 179 which is adapted to be connected to the main circuit so as to be responsive to the voltage thereof. An extension 181 of the armature 175 is adapted to normally engage the outer side of the relay armature 35 to normally restrain movement of the relay armature 35 to attracted position against the magnetic shunting loop 49. A spring 183 serves to bias the undervoltage armature 175 to holding position against the stationary core 173 and to return this armature to holding position following an undervoltage release operation. A dashpot device 185 of the sucker type comprising a movable sucker element 187 and a stationary sucker element 189 is provided for delaying a release operation of the undervoltage device for a predetermined time interval in order to prevent the undervoltage device from releasing the relay armature in response to transient or temporary undervoltage conditions in the main circuit. The relay contacts 37 and 39 are adapted to control energization of the tripping solenoid of the circuit breaker the same as in the Fig. 1 embodiment, and the energizing winding 41 is connected to the main circuit controlled by the breaker so as to be energized in response to the current of the main circuit. This embodiment of the invention having the undervoltage release feature is particularly applicable to the protection of inductive load circuits such as motor circuits.

The operation of the modification shown in Fig. 5 is briefly as follows. At all normal operating loads and on overloads up to the predetermined magnitude, which may be any desired value, the relay armature 35 will be attracted relatively strongly to the magnetic shunting loop 49. Actuation of the armature to attracted position against the shunting loop 49 is prevented, however, during normal voltage conditions in the main circuit by the undervoltage device 171. When the voltage of the main circuit drops a predetermined amount, for example, below 70% of the normal voltage of the circuit, and this drop in voltage persists for a predetermined time interval, the undervoltage armature 175 releases the relay armature 35 whereupon the relay armature is actuated to attracted position against the pole 53 of the magnetic shunting loop, thereby causing closing of the relay contacts 37—39 and tripping operation of the main circuit breaker. Immediately following interruption of the circuit by the main circuit breaker, the relay armature 35 is restored to its normal intermediate position by the spring 63, and the undervoltage armature 175 is restored to its holding position by the biasing spring 183. If the undervoltage condition is only of a transient nature, the time delay device 185 prevents release of the undervoltage armature, so that if the undervoltage condition clears itself within the time interval provided by the device 185, the relay 35 will not be operated in response to the undervoltage condition.

Upon the occurrence of an overload above the predetermined magnitude determined by the setting of the magnet bar 47, sufficient magnetic flux will be set up in the main magnetic circuit 45—47 to instantaneously operate the relay armature 35 to attracted position against the magnetic bar 47. This movement of the armature closes the relay contacts 37—39 and thereby effects tripping operation of the main circuit breaker in response to the overload or short-circuit condition.

While the invention has been disclosed in accordance with the provisions of the patent statutes, it is to be understood that various changes in the structural details, combinations, and arrangement of parts may be made without departing from some of the essential features of the invention. It is desired, therefore, that the language of the appended claims be given the broadest reasonable interpretation permissible in the light of the prior art.

I claim as my invention:

1. Circuit controlling apparatus comprising contact means, a magnetic structure having a movable armature for controlling said contact means and two poles on opposite sides of said armature, said armature being movable in opposite directions from a normal unattracted position and causing actuation of said contact means upon movement in either direction, a conductor for energizing said magnetic structure, one of said poles being nearer said armature than the other and said armature being attracted more strongly to the nearer pole and moved to said nearer pole in response to certain values of current through said conductor up to a predetermined magnitude and being attracted more strongly to said other pole and moved to said other pole when the current through said conductor exceeds said predetermined magnitude, and time delay means normally restraining said armature from moving to said nearer pole.

2. Circuit controlling apparatus comprising contact means, electromagnetic means including a stationary magnetic structure, a movable armature for controlling operation of said contact means, conductor means for energizing said magnetic structure, said magnetic structure having two flux paths, said armature being movable in opposite directions from a normal unattracted position and causing actuation of said contact means upon movement in either direction, the magnetic flux in one of said flux paths acting to move said armature in one direction in response to overload currents in a certain range up to a predetermined magnitude and the magnetic flux in the other of said flux paths instantaneously moving said armature in the other direction upon the occurrence of an overload current above said predetermined magnitude, means releasably restraining said armature from moving in said one direction and operable to release said armature, and time delay means normally delaying release of said armature and movement thereof in said one direction by the magnetic flux of said one flux path.

3. Circuit controlling apparatus comprising contact means, electromagnetic means including a magnetic structure, a movable armature for controlling operation of said contact means, conductor means for energizing said magnetic structure, said magnetic structure having two magnetic circuits, said armature being movable in opposite directions from a normal unattracted position and causing actuation of said contact means upon movement in either direction, the magnetic flux of one of said magnetic circuits acting to move said armature in one direction when the current through said conductor means is within a predetermined range up to a predetermined magnitude and the magnetic flux of the other of said circuits effecting movement of said armature in the opposite direction upon the flow of current in excess of said predetermined magnitude through said conductor means, means normally engaging and restraining said armature from being moved in said one direction, and means operable in response to predetermined abnormal conditions to operate said restraining means and permit movement of said armature in said one direction.

4. Circuit controlling apparatus comprising contact means, electromagnetic means including a movable armature for controlling operation of said contacts, a magnetizable structure having poles on opposite sides of said armature for moving said armature in opposite directions, conductor means for energizing said magnetizable structure, said magnetizable structure acting to move said armature toward one of said poles when the value of current in said conductor means is in a certain range up to a predetermined magnitude and effecting movement of said armature to the other pole instantaneously when the value of current exceeds said predetermined magnitude, and thermally responsive means normally restraining said armature from moving to said one pole, said thermally responsive means when heated a predetermined amount permitting movement of said armature to said one pole.

5. Circuit controlling apparatus comprising contact means, electromagnetic means including a movable armature for controlling operation of said contact means, magnetizable structure having poles on opposite sides of said armature for moving said armature in opposite directions from a normal position, conductor means for energizing said magnetizable structure, said magnetizable structure acting to move said armature toward one of said poles in response to overload currents in said conductor means up to a predetermined value and effecting movement of said armature instantaneously to the other of said poles upon the occurrence of overload currents in excess of said predetermined value, and a current responsive bimetal element heated in response to the current in said conductor means normally restraining said armature from moving to said one pole, said bimetal element when heated a predetermined amount by overload current permitting movement of said armature to said one pole.

6. Circuit controlling apparatus comprising contact means, electromagnetic means including a movable armature for controlling operation of said contact means, magnetizable structure having two magnetic circuits in parallel through said armature and two poles on opposite sides of said armature for moving said armature in opposite directions from a normal position, conductor means for energizing said magnetizable structure, said magnetizable structure acting to move said armature to one of said poles in response to overload currents below a predetermined magnitude and effecting movement of said armature to the other of said poles upon the occurrence of overload currents in excess of said predetermined magnitude, a part of the magnetic circuit that extends through said one pole being designed to saturate at some value of current below said predetermined magnitude, and a current responsive bimetal element normally restraining said armature from moving to said one pole, said bimetal element when heated a predetermined amount by overload current permitting movement of said armature to said one pole.

7. Circuit controlling apparatus comprising contact means, electromagnetic means including a movable armature for controlling operation of said contact means, magnetizable structure for said armature having two magnetic circuits in parallel through said armature and two poles on opposite sides of said armature for moving said armature in opposite directions from a normal position, conductor means for energizing said magnetizable structure, said magnetizable structure acting to move said armature to one of said poles in response to overload currents below a predetermined magnitude and effecting movement of said armature to the other of said poles instantaneously upon the occurrence of overload currents above said predetermined magnitude, a latch normally restraining said armature against movement to said one pole, and a current responsive bimetal element operable when heated a predetermined amount in response to overload current to cause said latch to release said armature to thereby permit movement of said armature to said one pole.

8. A circuit interrupter having, in combination, relatively movable contacts, operating mechanism therefor trippable to effect opening of said contacts, electromagnetic means comprising a movable armature movable in opposite directions from a normal unattracted position to cause tripping operation of said circuit breaker operating mechanism, magnetizable structure having two poles on opposite sides of said armature, said armature being movable in opposite directions and effecting tripping of said operating mechanism upon movement in either direction, conductor means energized in response to the current of the circuit for energizing said magnetizable structure, said magnetizable structure acting to move said armature to one of said poles when the current in the circuit is within a predetermined range up to a predetermined magnitude, and effecting movement of said armature to the other of said poles upon the occurrence of overload currents in the circuit above said predetermined magnitude, and means normally restraining said armature from moving to said one pole, said last mentioned means permitting movement of said armature to said one pole when predetermined abnormal conditions obtain in the circuit.

9. A circuit interrupter having in combination, relatively movable contacts, operating mechanism therefor, electromagnetic means comprising a movable armature movable in opposite directions from a normal unattracted position to cause automatic opening operation of said circuit breaker mechanism, magnetizable structure having two poles on opposite sides of said armature, said armature being movable in opposite directions from said normal position and causing automatic opening operation of said circuit breaker mechanism upon movement in either direction, conductor means energized in response to the current of the circuit for energizing said magnetizable structure, said magnetizable structure acting to move said armature to one of said poles in response to overload current in the circuit below a predetermined magnitude and effecting movement of said armature to the other pole upon the occurrence of overload currents above said predetermined magnitude, a member normally restraining said armature from moving to said one pole, and time delay means operable to permit movement of said armature to said one pole after a time delay in response to continued overloads below said predetermined magnitude in the circuit.

10. In a circuit breaker having relatively movable contacts, operating mechanism therefor including a member releasable to cause opening of said contacts, latching means for releasably restraining said member, a trip device comprising an armature movable in opposite directions from a normal position to actuate said latching means to release said member, magnetizable structure having two poles on opposite sides of said armature for moving said armature in opposite directions, conductor means for energizing said magnetizable structure in response to the current of the circuit, said magnetizable structure acting to move said armature to one of said poles in response to overload currents below a predetermined magnitude and effecting movement of said armature instantaneously to the other of said poles upon the occurrence of overload currents above said predetermined magnitude, and a current responsive bimetal latch normally restraining said armature from moving to said one pole, said bimetal latch when heated a predetermined amount by overload current being operable to release said armature to thereby permit movement of said armature to said one pole.

11. Circuit controlling apparatus for controlling an electric circuit comprising in combination, contact means, electromagnetic means including a movable armature movable in opposite directions from a normal position to cause operation of said contact means, magnetizable structure having two poles on opposite sides of said armature for moving said armature in opposite directions, conductor means for energizing said magnetizable structure in response to the current of the circuit, said magnetizable structure acting to move said armature to one of said poles when the current in the circuit is in a certain range up to a predetermined magnitude and effecting movement of said armature to the other of said poles upon the occurrence of overload currents above said predetermined magnitude, and undervoltage responsive means normally restraining said armature from moving to said one pole when normal voltage conditions obtain in said circuit, said undervoltage responsive means permitting movement of said armature to said one pole in response to a predetermined drop in voltage in the circuit.

12. Circuit controlling apparatus for controlling an electric circuit comprising in combination, relatively movable contact means, electromagnetic means including a movable armature movable in opposite directions from a normal position to cause an operation of said contact means, magnetizable structure having two poles on opposite sides of said armature for moving said armature in opposite directions from its normal position, conductor means for energizing said magnetizable structure in response to the current of the circuit, said magnetizable structure acting to move said armature to one of said poles in response to overload currents up to a predetermined magnitude and effecting movement of said armature to the other of said poles immediately upon the occurrence of overload currents above said predetermined magnitude, and a dashpot device for providing a time delay prior to operation of the armature to said one pole in response to overload currents.

13. An overload protective relay for controlling operation of a circuit breaker, comprising electromagnetic means having a movable armature movable in opposite directions from a normal position, means biasing said armature to normal position, relay contacts operated by movement of said armature in either direction, magnetizable structure having two poles on opposite sides of said armature for moving said armature in opposite directions from its normal position, conductor means for energizing said magnetizable structure in response to the current of the circuit, said magnetizable structure acting to move said armature to one of said poles in response to overload currents up to a predetermined magnitude and effecting movement of said armature instantaneously to the other of said poles upon the occurrence of overload currents above said predetermined magnitude, a latch normally restraining said armature from moving to said one pole, and a current responsive bimetal element operable when heated a predetermined amount in response to overload current to cause said latch to release said armature to permit movement thereof to said one pole.

FLOYD S. WHEELER.